May 3, 1927.

E. J. VON HENKE

1,626,769

ELECTRICAL WELDING APPARATUS

Filed May 13. 1922

Patented May 3, 1927.

1,626,769

UNITED STATES PATENT OFFICE.

EDMUND J. von HENKE, OF CHICAGO, ILLINOIS, ASSIGNOR TO AMERICAN ELECTRIC FUSION CORPORATION, OF CHICAGO, ILLINOIS, A CORPORATION OF ILLINOIS.

ELECTRICAL WELDING APPARATUS.

Application filed May 13, 1922. Serial No. 560,743.

My invention relates to electric welding apparatus, and particularly to spot welding apparatus.

By my present invention a machine of the type above indicated is produced which has many advantages from an operative standpoint. The features and advantages will be better understood by reading the following description taken in connection with the accompanying drawings, in which—

Figure 1:
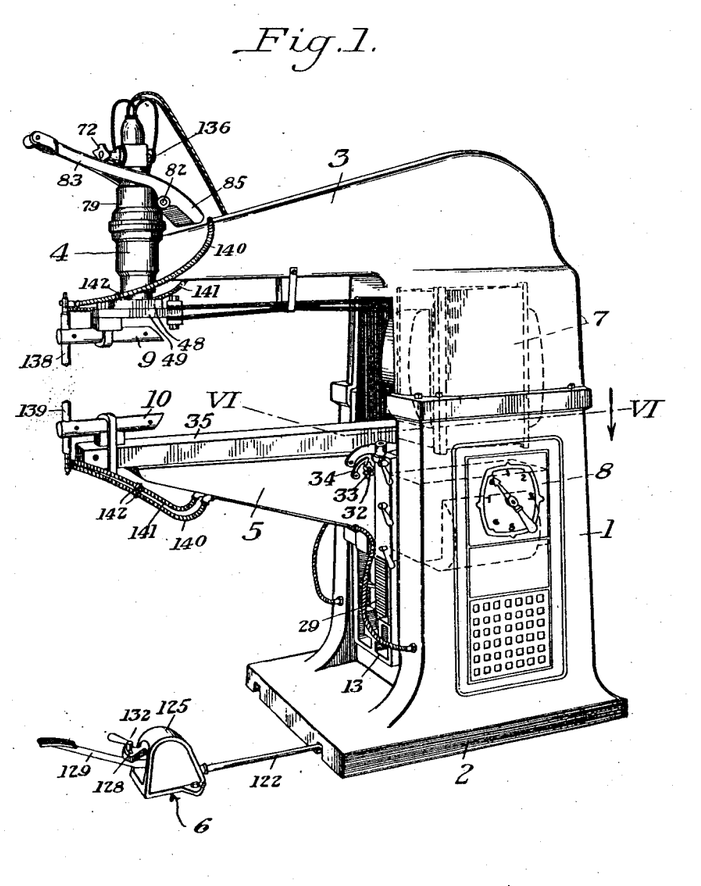
Figure 1 is a perspective view of a complete machine.

Referring to Figure 1 of the drawings, the machine comprises a pedestal 1 having a suitable base 2, an upper horn 3, a head 4, a lower horn 5, and a treadle mechanism 6. The pedestal 1 is of the box type of construction and houses the usual welding transformer 7 and heat regulator 8. The upper horn 3 is bolted to the pedestal 1 and carries an electrode holder 9, and the lower horn 5 carries an electrode holder 10.

Figure 6:
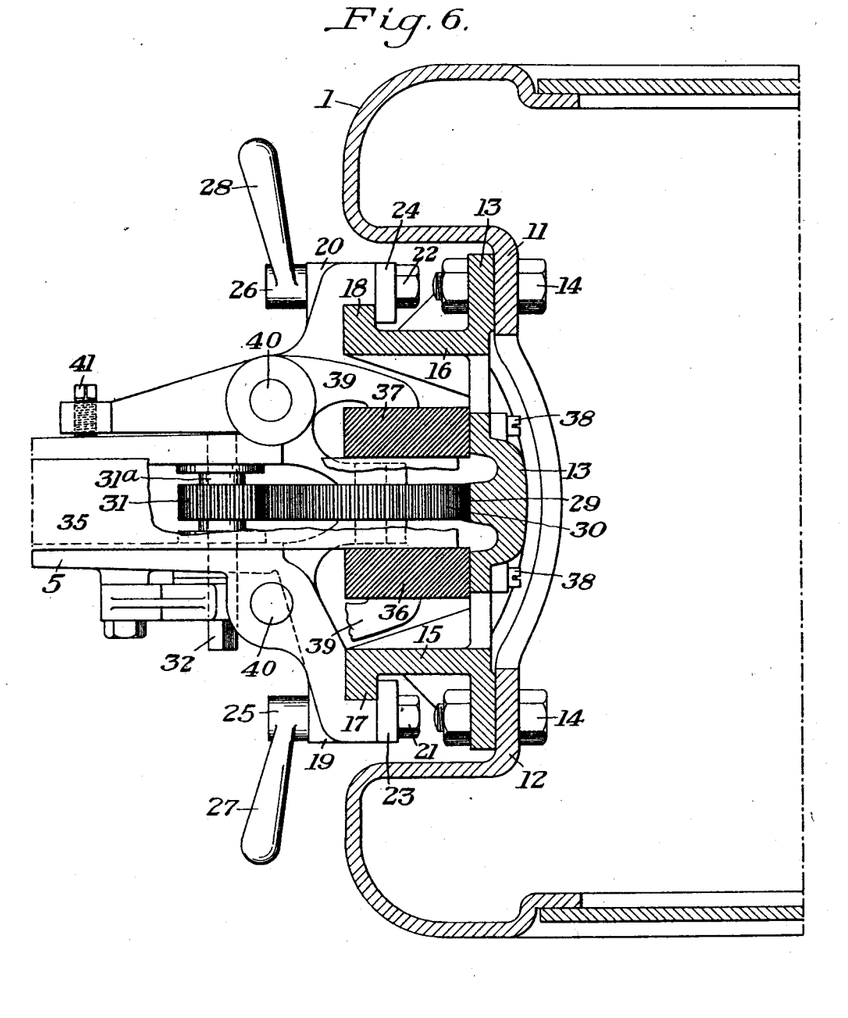
Figure 6 shows a section on line VI—VI of Figure 1.

In order to accommodate work of different shapes, the lower horn 5 is adjustable, and means for supporting that horn and adjusting the same will now be described. The front side of the pedestal is of the general configuration shown in Figure 6. The flat vertical portions 11 and 12 are provided with bolt holes, and a supporting member 13 for the horn is bolted thereto by bolts 14. The member 13 is provided with vertical ribs 15 and 16 on the outer edges of which are flanges or guides 17 and 18, respectively. The horn 5 is provided with flanges 19 and 20 which engage the outer faces and edges of the flanges 17 and 18, respectively. The flanges 19 and 20 are provided with openings through which tightening bolts 21 and 22 extend. Plates 23 and 24 are held in position by the bolts 21 and engage the rear faces of the flanges 17 and 18, as shown in Figure 6. The bolts 21 and 22 are provided with nuts 25 and 26. These nuts have handles 27 and 28 by which the nuts are tightened.

The member 13 is provided at its center with a rack 29. A gear 30 of large diameter is journaled in the horn 5 and meshes with the teeth on the rack 29. A small gear 31, also journaled in the horn 5, meshes with the gear 30. The shaft 31ᵃ of the gear 31 extends out through one side of the horn 5 and is provided at its end with a square portion 32. A ratchet wheel 33 is secured to the shaft 31, and a pawl 34 engages the teeth of the ratchet wheel 33, as shown in Figure 1. When it is desired to adjust the position of the horn 5, the nuts 25 and 26 are loosened and the gear 30 revolved by placing a wrench on the squared end 32 of the shaft 31. Upon turning the gear 30 in the proper direction, the horn will be moved up or down on the flanges 17 and 18, depending upon the direction of rotation of the gear. After the horn has been moved to the desired position, the pawl 34 is moved into engagement with the ratchet wheel 33 and the nuts 25 and 26 are tightened, thus holding the horn in the adjusted position.

Mounted on the horn 5 is a conductor 35. This conductor supports at its outer end the electrode holder 10 in any suitable way. The inner end of the conductor 35 is in electrical contact with the two vertical conductors 36 and 37, which are connected with the secondary of the transformer 7. A part of the conductor 35 is broken away in Figure 6 to show the gear 30, but as will be seen from that figure, the conductor 35 engages the inner sides of the conductors 36 and 37. The conductors 36 and 37 are connected to the member 13 by bolts 38. In order to insure good electrical contact between the conductors 35, 36 and 37, clamping members 39 are pivotally mounted on the sides of the horn 5. These clamping members are pivoted at 40 and one end thereof engages the outer sides of the conductors 36 and 37, and the other end of each is provided with a screw 41 which is threaded into the end of one of the members 39 and engages the sides of the other member 39, passing through a hole in the horn 5. When the screw 41 is tightened, the clamping members 39 force the conductors 36 and 37 tightly against the sides of the conductor 35 and thus firmly hold the same therebetween, thus insuring a good electrical contact.

The upper horn 3 carries the head 4. The end of the horn 3 is provided with a cylindrical portion 42 into which the head 4 is placed. The head comprises a cylindrical member 43 and has a flange 44 which engages the cylindrical portion 42 of the head 4. The horn 3 is cast with the cylindrical portion 42 thereon, and the cylindrical member 43 is also made of a casting of the same general shape as the interior of the member 42. In assembling the head on the horn the member 43 is placed inside the portion 42 and babbitt or other similar material 45 is poured in between the members 42 and 43. These parts are then bolted together by the bolts 46, whereby the head is securely held in place in the horn. By this method of assembly it is unnecessary to do any machine work in fitting the head into the horn, thus greatly decreasing the cost of the manufacture of such machines.

Figure 2:
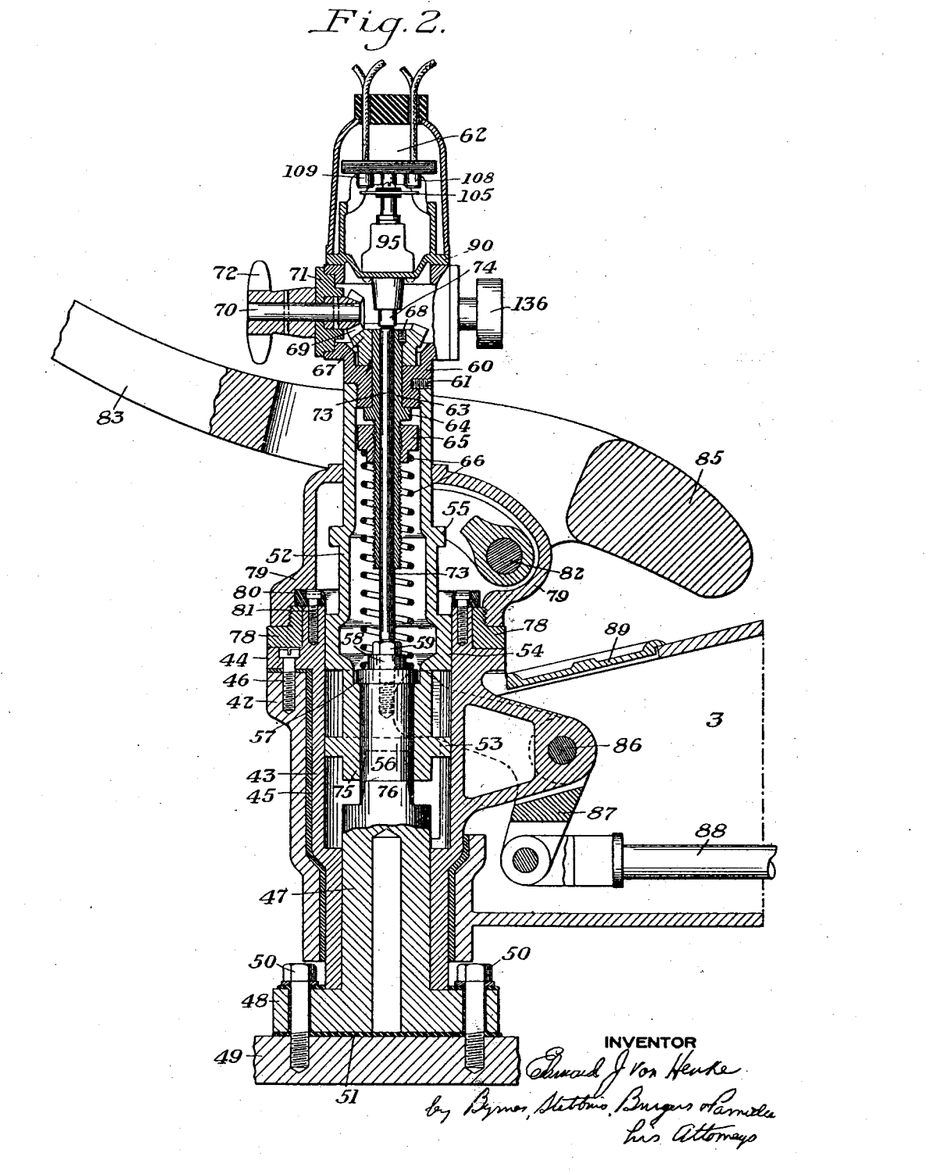
Figure 2 is a vertical section through the head of the machine.

The member 43 carries the reciprocating portion of the head. This mechanism comprises a cylindrical member 47 which fits in the lower part of the member 43. The member 44 has a flange 48 at its lower end which is connected to the contact plate 49 by bolts 50. The flange 48 is insulated from the block 49, as shown in Figure 2, by insulating material 51, which is placed between the flange 48 and block 49 and around the bolts 50. The member 47 is arranged to reciprocate in the member 43 as will appear later. Another cylindrical member 52 is mounted in the member 43 and is provided with three flanges 53, 54 and 55. The member 52 is hollow and is provided at its lower end with a member 56 having a head 57 thereon to limit the downward movement of the member 56 relative to the member 52 into which it closely fits. A collar 58 is held on the head 57 by a nut 59. The upper end of the member 52 is internally screw-threaded, and a member 60 is screwed thereinto and held in place by a setscrew 61. The member 60 supports the automatic switch 62. Extending through the member 60 is a bushing 63 having a flange 64 which engages the lower end of the member 60. The lower part of the bushing 63 is provided with threads and a nut 65 is screwed onto the threaded portion of the bushing 63.

One end of a spring 66 surrounds a portion of the member 65, and the other end of the spring surrounds the collar 58. A beveled gear 67 is fastened to the upper end of the bushing 63 by a setscrew 68. A beveled gear 69 meshes with the gear 67 and is carried on a shaft 70 journaled in a casing 71 supported by the member 60. The shaft 70 is provided at its outer end with a hand wheel 72. One end of a rod 73 engages the bolt 59 and the other end engages an operating rod 74 of the switch 62. The rod 73 passes through the bushing 63, as shown in Figure 2.

The lower end of the member 52 is provided with teeth 75. The upper end of the member 47 is provided with similar teeth 76. The teeth 75 are spaced apart, and likewise the teeth 76 are spaced apart. The space between the teeth 75 is equal to the width of the teeth 76, so that when the member 52 is moved downwardly the teeth 76 move up into the spaces between the teeth 75. The reason for this telescopic arrangement will appear later. The cylindrical portion 56 of the member 47 passes upwardly through an opening in the lower end of the member 52, as already explained. A ring 78 surrounds the upper end of the member 42 and is provided at its upper end portion with screw threads. A cap 79 is screwed onto the ring 78, as shown in Figure 2. A centering ring 80 is fastened to the upper end of the member 43 by bolts 81. The cap 79 together with the ring 78 are so arranged that they freely rotate around the member 43. The cap 79 carries a shaft 82 on the outer ends of which is fastened a bifurcated handle 83. The shaft 82 is free to rotate in its journals in the cap 79. Fastened to the shaft 82 on the inside of the cap 79 is a bifurcated operating member 84, the ends of which engage the upper side of the flange 55. The handle 83 is provided with a counterweight 85 which normally holds the handle in the position shown in Figures 2 and 3.

Figures 3, 4:
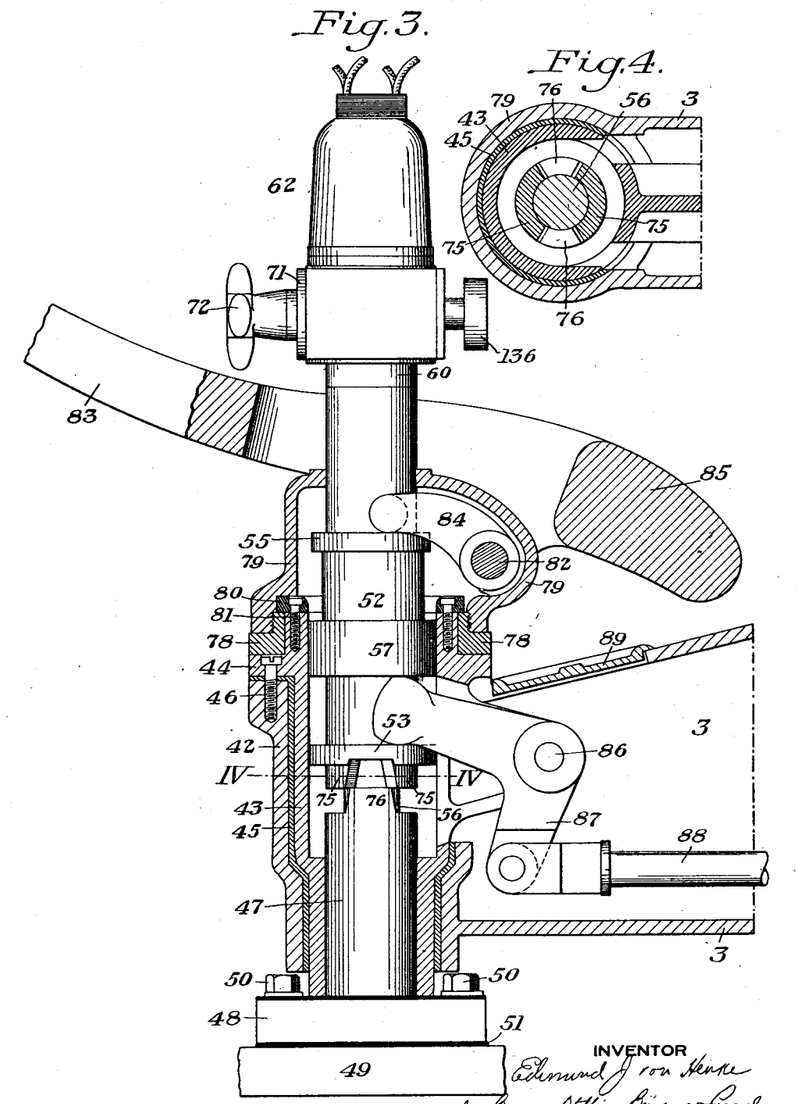
Figure 3 shows the head in elevation with certain parts of the supporting horn in section.
Figure 4 shows a cross section on line IV—IV of Figure 3.

The horn 3 is hollow. A bell crank lever is pivotally supported in the member 43 by a shaft 86. One end 87 of the bell crank connects with a rod 88, and the other end thereof is bifurcated and the parts engage with the member 52 between the flanges 53 and 57, as shown in Figure 3. The horn 3 is provided with a hand hole over which a cover 89 is placed.

Figure 5:
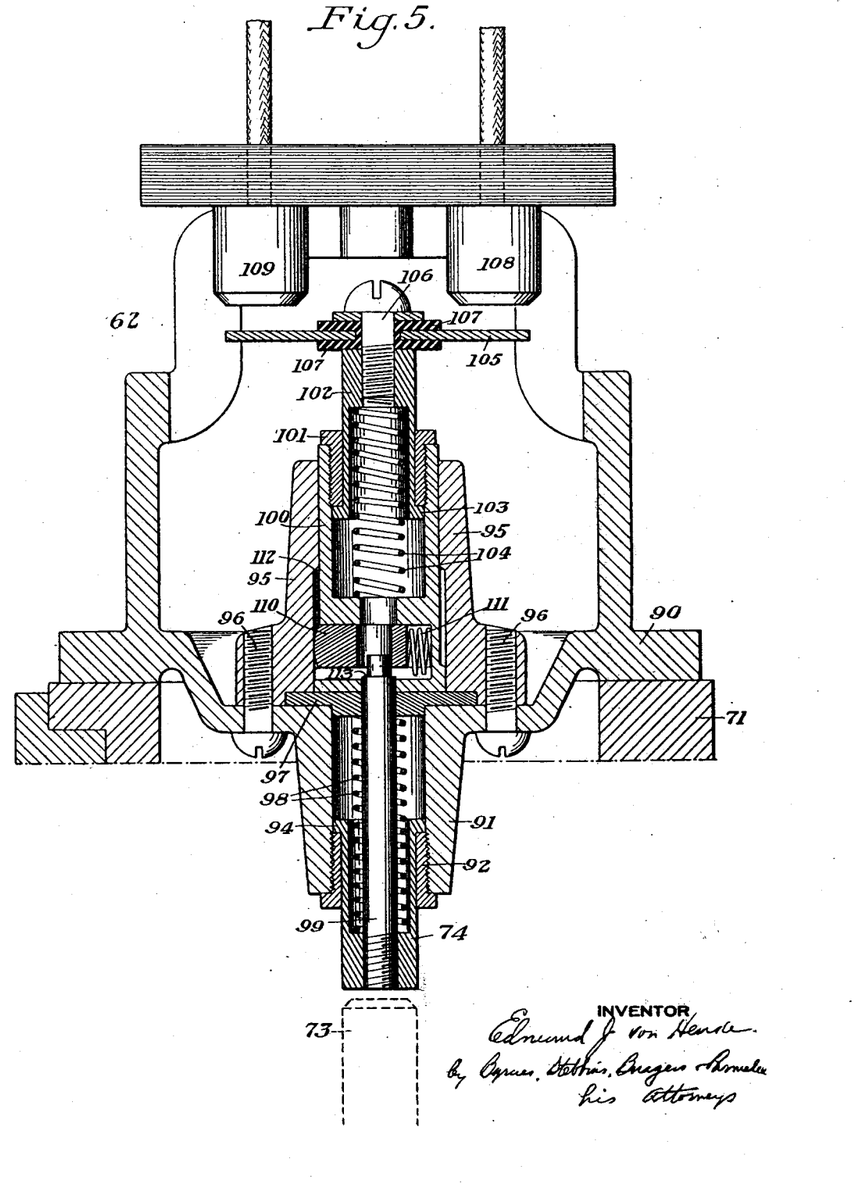
Figure 5 is a vertical section of the automatic switch located on the head.

The switch 62 is shown in detail in Figure 5. This switch comprises a frame member 90 having a depending portion 91 into which a bushing 92 is screwed. A second bushing 74 is placed inside the bushing 92 and has a head 94 thereon to limit the downward movement thereof. A member 95 is fastened to the frame 90 by screws 96. A member 97 is clamped between the member 95 and portion 91. One end of a spring 98 engages the member 97 and the other end engages a shoulder on the bushing 74. A rod 99 is screwed into the bushing 74 and extends upwardly through the member 97. A cylindrical member 100 fits into an opening in the member 95, and a bushing 101 is screwed into the member 100. A second bushing 102 is placed inside the bushing 101 and has a head 103 which limits the upward movement thereof in the bushing 101. The member 100 is cup-shaped and is provided with an opening in its bottom part. One end of a spring 104 engages the bottom of the cup member 100, and the other end engages a shoulder on the bushing 102. The upper end of the bushing 102 carries a contact 105 held in place by a screw 106. The contact 105 is insulated from the screw and the bushing by insulating material 107. The contact member 105 is adapted to connect the fixed contacts 108 and 109 together. Placed in the lower portion of the member 100 is a cam member 110. This member is normally held in the position shown by a spring 111. The interior of the member 95 is provided with a cam surface 112 which is engaged by the end of the member 110, which is pushed to the right as it is moved upwardly, as will appear later. The upper end of the rod 99 is reduced in diameter so as to form a shoulder 113 which engages the lower side of the member 110 and pushes that member together with the member 100, upwardly, as will be explained later.

Figure 7:
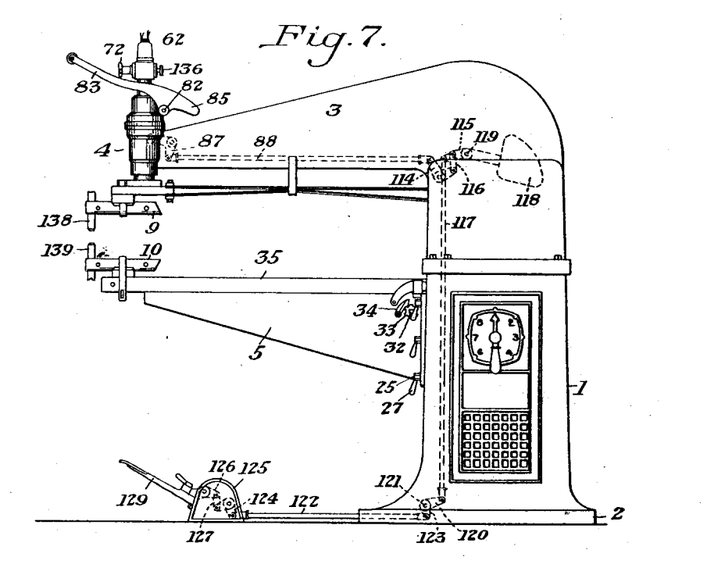
Figure 7 is a side elevation of the machine, showing the treadle operating means in dotted lines, certain parts being omitted.
Figure 8:
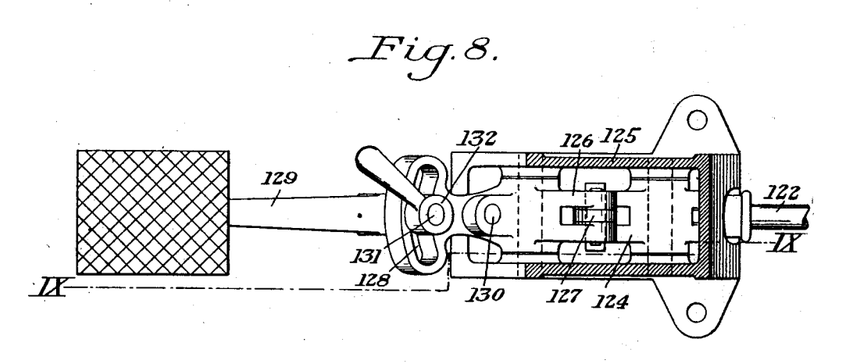
Figure 8 is a sectional view of the treadle mechanism on line VIII—VIII of Figure 9.
Figure 9:
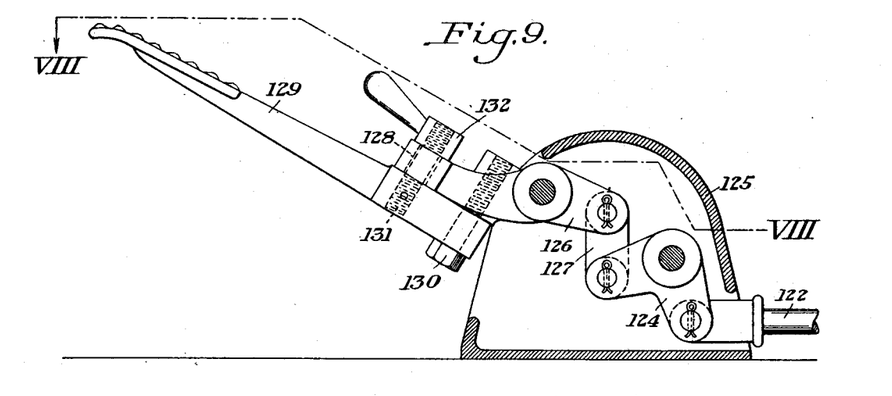
Figure 9 shows a vertical section of the treadle mechanism on line IX—IX of Figure 8.
Figure 10:
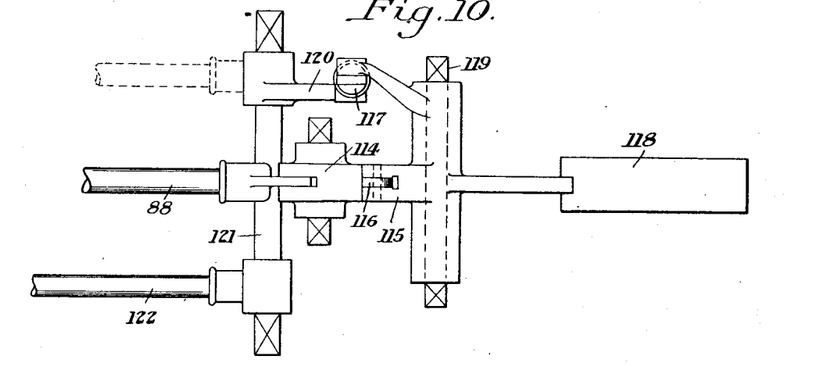
Figure 10 shows a detail of a portion of the treadle operating means.

Referring to Figure 7, the rod 88 connects with a bell crank 114 which in turn connects with a lever 115 through a link 116. A rod 117 also connects with the lever 115, and a counterweight 118 is placed on the other end of the lever 115, which lever is pivoted at 119. The rod 117 connects with a lever 120, which is mounted on the shaft 121. A rod 122 connects with a lever 123 also mounted on the shaft 121. The rod 122 connects with a bell crank 124 mounted in a casing 125. The other end of the bell crank 124 connects with a member 126 through a link 127. One end of the member 126 is provided with an elongated slot 128. A treadle 129 is pivotally connected with the member 126 by a bolt 130. A bolt 131 is fastened in the treadle 129 and extends upwardly through the slot 128 in the member 126, and a nut 132 is screwed onto the bolt 131 and when tightened holds the members 126 and 129 in fixed relation to each other. By reason of the arrangement described, the treadle 129 may be moved to any desired angle with respect to the member 126.

Figure 11:
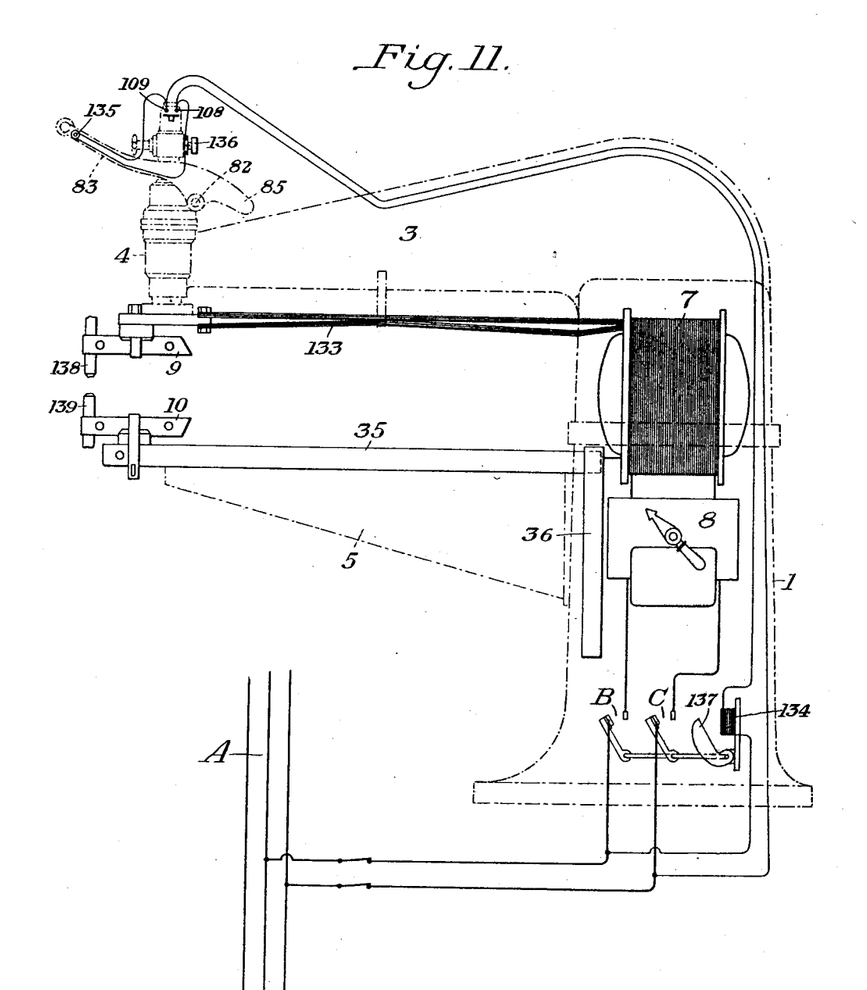
Figure 11 is a diagrammatic view of the electrical circuits with certain parts of the mechanical structure shown in outline.

Referring to Figure 11, current is taken from one phase A of the supply line and is carried through the contactors B and C, through the regulator 8 to the primary of the transformer 7. The secondary of the transformer includes the conductor 35, the conductor 133, and the electrodes. A control coil 134 is connected across the phase A through the switch contacts 108 and 109. A switch 135 is provided in the handle 83, the switch 135 being in multiple with the contacts 108 and 109. A snap switch 136 of any desired construction is connected in the line leading to the switch 135. Upon the closure of the contacts 108 and 109 or switch 135, a circuit is established through the coil 134 which attracts the armature 137, thus closing the contactors B and C which control the primary of the transformer.

The operation of my device is as follows:

The work is placed between the electrodes, and the handle 83 or the treadle 129 is moved downwardly. If the handle is used to operate the head, the members 84 engage the flange 55 and move the member 52 and all the parts supported thereby downwardly. This movement brings the upper electrode into contact with the work, and as the handle is moved downwardly pressure is created by reason of the compression of the spring 66. The movement of the member 52 downwardly with respect to the member 56, compresses the spring 66, and the rod 73 operates upon the end of the rod 74 of the switch 62 and pushes the disk 105 into contact with the contacts 108 and 109, thus closing the circuit of the control coil 134, whereupon current is sent through the electrodes and the work which is between them. As the member 52 is moved further downwardly, the member 110 of the switch 62 (best shown in Fig. 5) is moved upwardly relative to the member 95 by the engagement of the shoulder 113 with the member 110. When the member 110 is pushed to the right by the cam surface 112, the member 110 is pushed off of the shoulder 113 and the spring 104 forces the member 110 downwardly around the rod 99, thus separating the contacts 108 and 109 and opening the circuit of the transformer. From the foregoing it will therefore appear that the pressure between the electrodes and the work depends upon the strength of the spring 66. This pressure may remain on the work after the current is cut off. When the member 52 has moved downwardly so that the ends of the teeth 75 engage the member 47, the pressure will be dependent upon the force exerted on the end of the handle 83, but it will be understood that the current is cut off from the transformer before this condition exists. As soon as the pressure is released from the handle 83, the counterweight 118 acts to lift the parts to the position shown in the drawings. If the welding operation is performed by the use of the foot treadle instead of the handle, the power is communicated from the treadle 129 through the rods 122, 117 and 88, to the flange 53.

This operation has exactly the same effect as does the operation by the use of the handle.

By reason of the mounting of the cap 79 on the flange 44 so that it is rotatable thereon, it will be apparent that the welding operation may be performed by the use of the handle 83 in any position around the head. This is a decided convenience, as the operator is enabled to move to any desired position and still operate the handle with ease. A similar provision is made regarding the foot treadle, in that the treadle 129 may be moved to different positions in the slot 128, thereby placing the treadle conveniently to the operator. The length of the rod 122 may be made any desired amount, depending upon the depth of throat of the machine, so as to bring the treadle 129 in the proper position relative to the electrodes.

It is sometimes desirable to have the operator apply the pressure directly to the welding electrodes instead of applying this pressure through a spring. In such cases, the member 52 may be rotated 90° relative to the member 47, so that the lower ends of the teeth 75 engage the upper ends of the teeth 76, thus fixing the parts 52 and 47 relative to each other. In this position of the member 52, the power which is applied either through the handle 83 or the treadle 129 will be communicated directly to the upper electrode, thus eliminating the spring 66.

The compression on the spring 66 may be varied if desired by turning the hand wheel 72. This movement is communicated through the gears 69 and 67 to the member 63. By turning the hand wheel 72 in the proper direction, the nut 65 may be moved up or down on the member 63 so as to decrease or increase the compression of the spring 66. The friction of the upper end of the spring around the nut 65 is sufficient to prevent the nut from rotating with the member 63.

The shaft 121 to which the rod 122 is connected, extends across the front of the machine so that the rod 122 may be disconnected from the shaft 121 and moved to the other side of the machine from that shown in Figure 1 if, as is sometimes the case, it is more convenient to operate the treadle from that side of the machine than from the side to which the rod 122 is connected in Figure 1.

The electrodes 138 and 139 may be of any desired construction, but they are shown in the drawings as being of the water cooled type. Water is fed into the electrodes through an armored flexible hose 140 and is discharged therefrom through similar hose 141. Insulators 142 are provided in the metal armor of the hose for electrical reasons. The circuit carrying leads supplying the upper electrode are suitably supported and insulated from the frame of the machine.

In using the term "babbitted" in the claims, I wish it to be understood that I am not limited to the use of babbitt, but that word is used as denoting a method of application rather than specifying the particular material to be used in applying the head to the horn.

My invention has many advantages resulting from the arrangement of the parts heretofore described. The pedestal and horn are of the box type, thus enclosing all the parts of the machine; the horn is detachable from the pedestal so that horns of different throat depth may be easily substituted one for the other; by babbitting the head in place in the horn a great deal of expense is saved in that accurate machining of the parts is unnecessary; by reason of the foregoing features an upper horn of different length may be readily substituted and the head removed from the old horn and applied to the new without any machine work, thus considerably reducing the expense as compared with machines as heretofore constructed where each head was specially fitted to each horn, and thus rendering an interchange impossible; the automatic switch on the head holds the contacts closed while the electrodes grip the work, and automatically opens the circuit of the transformer before the pressure between the work and the electrodes is released; the swivel handle makes operation of the head convenient from any position occupied by the operator; the foot treadle may be placed at any position by changing the length of the connecting rod between the treadle and the machine; at the same time the movement of the operator's foot remains the same regardless of the distance of the treadle from the machine, thus insuring a uniform pressure between the work and the electrodes for all depths of throat; the treadle is adjustable angularly for the convenience of the operator; the movable electrode and the parts operable therewith are accurately counterbalanced, thus increasing the ease of operation of the machine; powerful clamps are used to insure a good contact between the vertical conductors and the conductor on the lower horn, whereby the electrical contact in the secondary remains efficient regardless of the pressure on the outer end of the conductor, the contact between the vertical and horizontal conductors being in effect a wiping contact; means are provided for eliminating the action of the automatic switch, if desired, and at the same time allowing a direct application of pressure from the handle or the pedal to the electrode. By the arrangement described the handle or the treadle may be used interchangeably without the necessity of disconnecting one when the other is used.

While I have shown and described in great detail one embodiment of the invention, I desire it to be understood that I am not to be limited to the exact arrangements shown, as many changes may be made in the details without departing from the spirit of my invention.

I claim:

1. In a welding machine, the combination of a horn, a head carried thereby, a reciprocable member in said head, an electrode carried by said head, a spring between said member and electrode through which the electrode is operable by said member, and means for rotating said reciprocable member to render said spring operatively ineffective, substantially as described.

2. In a welding machine, the combination of a pedestal, parallel conducting members attached thereto, an adjustable horn supported by said pedestal, and a conductor carried by said horn and held between said conducting members, substantially as described.

3. In a welding machine, the combination of a pedestal, parallel conducting members attached thereto, an adjutsable horn supported by said pedestal, means for adjusting said horn, and a conductor carried by said horn and held between said conducting members, substantially as described.

4. In a welding machine, the combination of a pedestal, parallel conducting members attached thereto, an adjustable horn supported by said pedestal, means for adjusting said horn, a conductor carried by said horn and held between said conducting members, and means for clamping said conducting members against said conductor, substantially as described.

5. In a welding machine, the combination of a pedestal, a supporting member attached to said pedestal and provided with guides, a horn supported by said member, means for adjusting said horn along said guides, a conductor carried by said member, a conductor carried by said horn, and means for connecting said conductors together, substantially as described.

6. In a welding machine, the combination with a pedestal, of vertical parallel conductors mounted on the pedestal, a horizontally extending conductor having one end between said vertical conductors, and means for clamping said horizontal conductor between said vertical conductors, substantially as described.

7. In a welding machine, the combination with a pedestal, of vertical parallel conductors mounted on the pedestal, a horizontally extending conductor having one end between said vertical conductors, and means mounted on said horn for clamping said horizontal conductor between said vertical conductors, substantially as described.

8. In a welding machine, the combination of a horn, a head carried thereby, an electrode carried by said head, a foot treadle for operating said electrode, and means for angularly adjusting said treadle, substantially as described.

9. In a welding machine, the combination of a horn, a head carried thereby, an electrode carried by said head, a foot treadle for operating said electrode, comprising a pivoted member, means operatively connecting said member with said electrode whereby a given movement of said member produces a given movement of said electrode irrespective of the length of said connecting means, and means for angularly adjusting said member in a horizontal plane, substantially as described.

10. In a switching device, the combination of a circuit closing member, two telescopic members, and means relatively locking said members until the circuit closing member is in circuit closing position.

11. In a switching device, the combination of a circuit closing member, two telescopic members, means relatively locking said members until the circuit closing member is in circuit closing position, and means releasing said members while one of them is moving in a circuit closing direction.

12. In a switching device, the combination of a casing, a spring actuated contact controlling member in said casing, an actuating member for said last member, means for locking said members together until the switch is closed, and means for automatically unlocking said members while the actuating member is moving in a circuit closing direction, substantially as described.

13. In a switching device for welding machines, the combination of contacts, a contact closing member, means for moving said member to circuit closing position and holding the circuit closed, and means for automatically opening said switch while the contact closing member is moving in the same direction, substantially as described.

14. In a switching device, the combination of contacts, a contact closing member, an actuating member, a spring between said contact member and said actuating member, means for locking said members together and means for disconnecting said members at a predetermined point in the circuit closing movement of said members, substantially as described.

15. In a switching device, the combination of contacts, a contact member, a spring through which said member is actuated, a member engaging one of said spring and acting through said spring to actuate said contact member, and means for operatively disconnecting said actuating means from said spring, substantially as described.

16. In a switching device, the combination of contacts, a contact member, a spring through which said member is actuated, a member engaging one end of said spring and acting through said spring to actuate said contact member, and means for operatively disconnecting said actuating means from said spring at a predetermined point in the movement of said member in circuit closing direction, substantially as described.

17. In a switching device, the combination of contacts, a contact member for bridging said contacts, actuating means for said contact member comprising a bushing, a spring between said bushing and contact member, a rod for actuating said bushing, and a transverse spring actuated member operatively locking said rod with said bushing, substantially as described.

18. In a switching device, the combination of contacts, a contact member for bridging said contacts, actuating means for said contact member comprising a bushing, a spring between said bushing and contact member, a rod for actuating said bushing, a transverse spring actuated member operatively locking said rod with said bushing, and means for moving said locking member to operatively disconnect said rod from said bushing, substantially as described.

In testimony whereof I have hereunto set my hand.

EDMUND J. von HENKE.